United States Patent
Tanibata et al.

(10) Patent No.: US 7,599,113 B2
(45) Date of Patent: Oct. 6, 2009

(54) METHOD FOR ADJUSTING CONFOCAL MICROSCOPE

(75) Inventors: Yasuhiro Tanibata, Musashino (JP); Kenji Hachiya, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 232 days.

(21) Appl. No.: 11/710,415

(22) Filed: Feb. 26, 2007

(65) Prior Publication Data

US 2007/0216999 A1  Sep. 20, 2007

(30) Foreign Application Priority Data

Feb. 24, 2006  (JP) .............. 2006-048339

(51) Int. Cl.
*G02B 21/00* (2006.01)
(52) U.S. Cl. .............. 359/368; 359/363; 359/385
(58) Field of Classification Search .......... 359/368–390
See application file for complete search history.

(56) References Cited

U.S. PATENT DOCUMENTS

| | | | | |
|---|---|---|---|---|
| 6,191,885 | B1 * | 2/2001 | Kitagawa | 359/368 |
| 6,281,657 | B1 * | 8/2001 | Matsuo | 318/705 |
| 6,320,185 | B1 | 11/2001 | Matsuo | |
| 6,426,835 | B1 * | 7/2002 | Endo et al. | 359/388 |

FOREIGN PATENT DOCUMENTS

| | | | |
|---|---|---|---|
| JP | 5060980 | A | 12/1993 |
| JP | 9-297267 | A | 11/1997 |
| JP | 2000-275542 | A | 10/2000 |

OTHER PUBLICATIONS

English abstract of the Japanese reference 5-60980.

* cited by examiner

*Primary Examiner*—Thong Nguyen
(74) *Attorney, Agent, or Firm*—Sughrue Mion, PLLC

(57) ABSTRACT

A method for adjusting a confocal microscope which includes a microscope unit and a confocal scanner unit of Nipkow disk type, emits a light beam for image measurement on a sample, images a returned fluorescent light of the light beam by a CCD (charge-coupled device) digital camera as a confocal image, and enables observation of the sample by the confocal image, the method includes matching a phase of rotation of the Nipkow disk with a phase of an exposure time of the CCD digital camera.

14 Claims, 7 Drawing Sheets

FIG. 3

| EXPOSURE TIME | INTEGRATION NUMBER | ROTATIONAL SPEED |
|---|---|---|
| 0.024 | 8 | 1666.6667 |
| | 9 | 1875 |
| | 10 | 2083.3333 |
| | 11 | 2291.6667 |
| | 12 | 2500 |
| | 13 | 2708.3333 |
| | 14 | 2916.6667 |
| | 15 | 3125 |
| | 16 | 3333.3333 |
| | 17 | 3541.6667 |
| | 18 | 3750 |
| | 19 | 3958.3333 |
| | 20 | 4166.6667 |
| | 21 | 4375 |
| | 22 | 4583.3333 |
| | 23 | 4791.6667 |
| | 24 | 5000 |

|  | MINIMUM | ARBITRARY | ARBITRARY | OPTIMUM VALUE | MAXIMUM |
|---|---|---|---|---|---|
| Speed | 1500rpm | 3000rpm | 3200rpm | 4375rpm | 4999rpm |
| AVE | 3096.522 | 3094.61 | 3097.467 | 3093.788 | 3095.823 |
| σ/AVE | 0.016704 | 0.005515 | 0.006543 | 0.005904 | 0.005586 |
| σ | 51.72577 | 17.06683 | 20.26633 | 18.26471 | 17.29177 |

PLOT OF BRIGHTNESS IN DIRECTION Y (EXPOSURE TIME: 24 ms)

METHOD FOR ADJUSTING CONFOCAL MICROSCOPE

This application claims foreign priority based on Japanese Patent application No. 2006-048339, filed Feb. 24, 2006, the content of which is incorporated herein by reference in its entirety.

BACKGROUND OF THE INVENTION

1. Field of the Invention

The present invention relates to a confocal microscope, and more particularly, to a method for adjusting the confocal microscope, which eliminates occurrence of synchronous fringes (moiré fringes) during observation of a sample.

2. Description of the Related Art

A confocal microscope is for observing a sample by scanning a point of collected light on the sample through use of a laser (hereinafter called as a light beam for optical image measurement) and making fluorescent light that returns from the sample form an image. The confocal microscope is used for observing physiological reaction and morphology of live cells in the fields of biology, biotechnology, and the like, or for observing the surface of an LSI (large scale integration) in the field of semiconductors, etc.

FIG. 1 is a block diagram of a principal section showing an example of a confocal microscope used in the related art and in an embodiment of the present invention. In FIG. 1, a confocal scanner unit 1 is connected to a port 3 of a microscope unit 2, and a light beam 4 for image measurement is collected to individual light fluxes by microlenses 6 of a microlens array disk 5. After having passed through a dichroic mirror 7, the light fluxes pass through individual pinholes 9 of a pinhole disk (hereinafter called as a Nipkow disk) 8, and are collected onto a sample (omitted from the drawings) on a stage 11 by an objective lens 10 of the microscope unit 2.

The sample gives fluorescent light by radiation of the light beam 4 for image measurement. The fluorescent light returned from the sample again passes through the objective lens 10, and is collected onto the individual pinholes 9 of the Nipkow disk 8. The returned fluorescent light having passed through the individual pinholes is reflected by the dichroic mirror 7, and is imaged by an image sensor 13 (CCD: charge coupled device) via a relay lens 12.

In such an apparatus, the microlens array disk 5 and the Nipkow disk 8 are coaxially rotated at a given speed by a motor which is not shown, and the point of collected light on the sample is scanned by a movement of the pinholes 9 induced by the rotation.

The surface of the Nipkow disk 8 where the pinholes 9 are arranged, a surface to be observed on the sample, and a light-receiving face of the image sensor 13 are arranged in an optically conjugate relationship. Accordingly, an optical cross-sectional view of the sample, namely, a confocal image, is formed on the image sensor 13. Details of the confocal microscope of a Nipkow disk type are described in JP-A-5-60980.

JP-A-5-60980 describes a confocal optical scanner, in which imaging characteristic is enhanced and stray light from the pinhole surface is reduced.

Incidentally, in such a confocal microscope, the pinholes thoroughly scan over the screen that is displayed via the image sensor to create one screen every time the pinhole disk rotates for 30°.

For instance, when the disk is rotating at 5000 rpm, the time required to create one screen is computed as 1 ms in accordance with the following equation; specifically, 5000 rpm/60 seconds=83.33 rps Frame rate=83.33*12=1000 fps (1000 frames per second)

Frame cycle=1/1000 fps=1 ms

During observation of an image by using the confocal microscope, when an exposure time of the camera becomes shorter (100 ms or less, particularly, a video rate of 33 ms or less), circular-arc lateral fringes called synchronous fringes, such as those shown in FIG. 2A, sometimes appear in an image. The reason for this is that, in a case where one image is formed when the Nipkow disk has rotated for 30°, for example, a phase difference arises between the exposure time of the CCD digital camera and the rotation of the disk.

There are an equiangular spiral layout, a square layout, a constant pitch spiral layout and the like, as ways of arranging pinholes. The arrangement of the pinholes used in the present invention is the constant pitch spiral layout such as that shown in FIG. 2B.

When an NTSC (National Television System Committee) camera is used, there is prepared a mechanism for inputting a video composite signal of the camera to a synchronous input terminal of the confocal microscope to thus synchronize the rotation of a disk. However, in the case of a CCD digital camera which performs non-interlace imaging, an effective mechanism for synchronizing the rotation of the disk is not available.

SUMMARY OF THE INVENTION

The present invention has been made in view of the above circumstances, and provides a method for eliminating synchronous fringes by obtaining an optimum number of rotation from an exposure time through computation and setting the number of rotation in a confocal scanner unit (CSU) through use of an rpm (number of rotation) setting command or the like, to thus set the optimum number of rotation of the pinhole disk of the confocal microscope.

The present invention provides, a method for adjusting a confocal microscope which includes a microscope unit and a confocal scanner unit of Nipkow disk type, emits a light beam for image measurement on a sample, images a returned fluorescent light of the light beam by a CCD (charge-coupled device) digital camera as a confocal image, and enables observation of the sample by the confocal image, the method comprising:

matching a phase of rotation of the Nipkow disk with a phase of an exposure time of the CCD digital camera.

In the method for adjusting a confocal microscope, a time (s) required to create one screen of the confocal image is obtained by the following equation:

$$s = 60/(\text{a number of the rotation of the Nipkow disk} * 12),$$

wherein a unit of the time (s) is second.

In the method for adjusting a confocal microscope, provided that an integration number is an integral multiple (n times) of the time (s) required to create one screen, the exposure time (t) is obtained by the following equation:

$$t = (\text{the integration number}) * (\text{the time } (s) \text{ required to create one screen}).$$

In the method for adjusting a confocal microscope, the number (f) of the rotation of the Nipkow disk after the exposure time (t) is determined is obtained by the following equation:

$f=5/\{(\text{the exposure time }(t))/(\text{the integration number }(n))\}.$

In the method for adjusting a confocal microscope, a number of the rotation of the Nipkow disk is equal to or more than 1500 rpm and less than 5000 rpm.

In the method for adjusting a confocal microscope, the phase of the rotation of the Nipkow disk and the phase of the exposure time of the CCD digital camera are set by communication using an external device.

The method for adjusting a confocal microscope, wherein the phase of the rotation of the Nipkow disk and the phase of the exposure time of the CCD digital camera are set, and a waiting time is provided after an image transfer time.

BRIEF DESCRIPTION OF THE DRAWINGS

FIG. 3 is a descriptive table for selecting optimum integration number when an exposure time is set to a predetermined time;

DESCRIPTION OF THE PREFERRED EMBODIMENTS

The present invention will be described in detail hereunder.

First, a time (s) required to create one screen is obtained from a number of rotation of a Nipkow disk by the following equation.

$$s=60/(\text{number of rotation of Nipkow disk}*12) \quad (1)$$

In order to delete synchronous fringes, an exposure time (t) is set so as to be an integral multiple (n times) of the time (s) required to create one screen. This "n" is called as an integration number.

$$\text{Exposure time }(t)=\text{integration number }(n)\times\text{time required to create one screen }(s) \quad (2)$$

The optimum number of rotation (f) achieved when the exposure time has been determined can be obtained by the following equation.

$$\text{Number of rotation }(f)=5/\{(\text{exposure time/integration number})\} \quad (3)$$

Here, the number of rotations per minute has to range from 1500 rpm to less than 5000 rpm.

Namely, $1500 \leq$ number of rotation (rpm) $<5000$

When the number of rotation is selected in the above requirement so that Equations (1), (2) and (3) are satisfied, the number of rotation approaches an integral, and the integration number is large, an image in which synchronous fringes do not exist can be acquired.

FIG. 3 is a table for selecting the optimum integration number when the exposure time is set to, e.g., 24 ms. Specifically, provided that the exposure time is set to 0.024 seconds and that the integration number is set to 8 to 24 which are integers, the number of rotation of the Nipkow disk is determined.

When the integration number is set to 7, the number of rotation is determined as follows in accordance with Equation (3).

$$\text{Number of rotation }(f)=5/(0.024/7)=1458.3$$

Accordingly, a requirement of $1500 \leq$ number of rotation (rpm) is not satisfied. Moreover, when the integration number is set to 24, the number of rotation (f) is determined as follows.

$$\text{Number of rotation }(f)=5/(0.024/24)=5000$$

Accordingly, a requirement of the number of rotation (rpm) $<5000$ is not satisfied.

FIG. 3 shows values that are dividable by integers when the integration number is 9, 12, 15, 18, and 21. Among the numbers, 4375 rpm, of which integration number is the largest as 21, is considered to be the optimal number of rotation.

Advantages of the present invention will now be described by reference to FIGS. 4 to 7B. Measurement conditions are as follows.

1) In order to minimize synchronous fringes resulting from transfer of an image of a CCD camera, a reading speed is set to a low speed.

Figure 1:
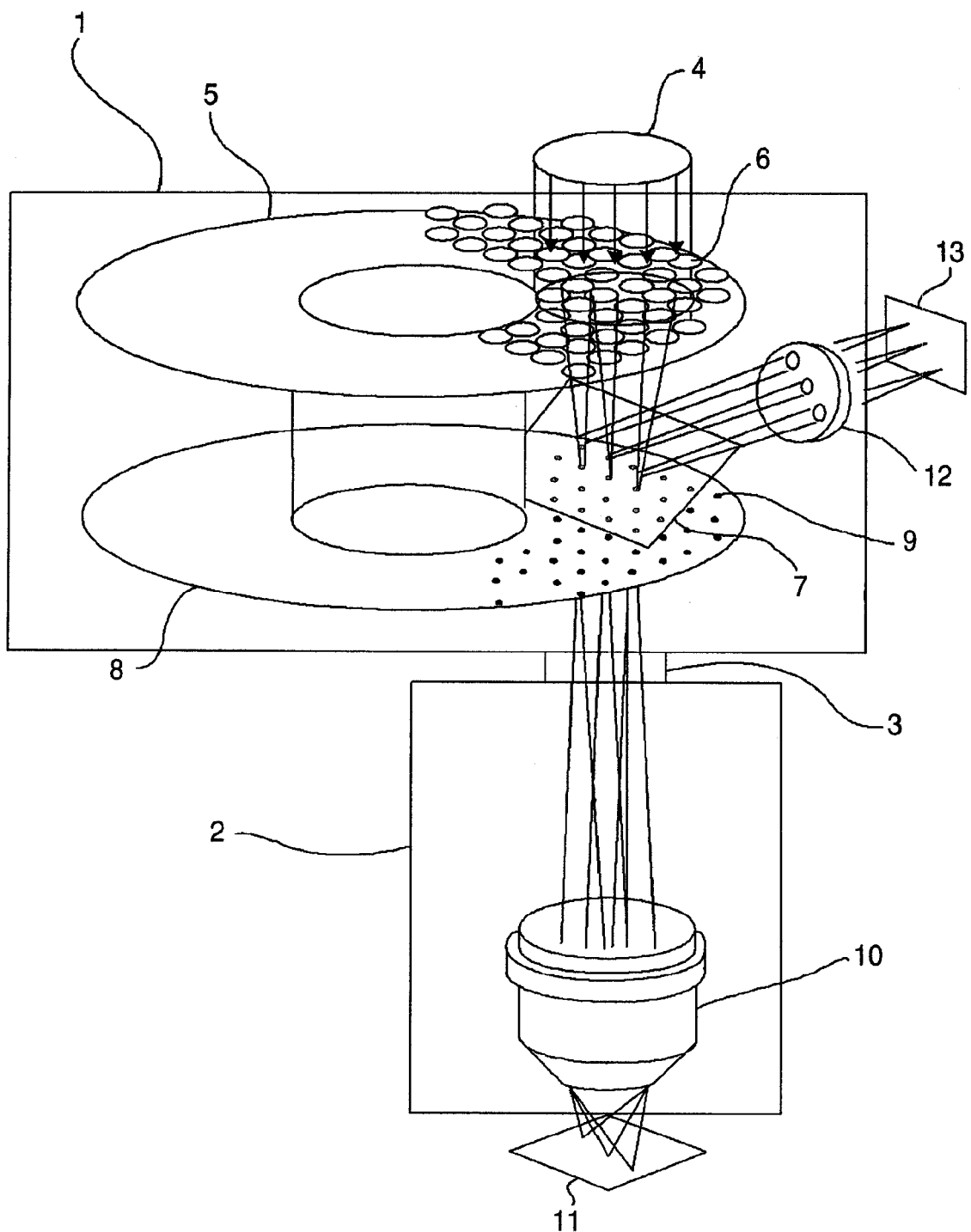
FIG. 1 is a block diagram of principal sections of a confocal microscope showing an embodiment of the present invention and an example of the related art.
Figure 2A:
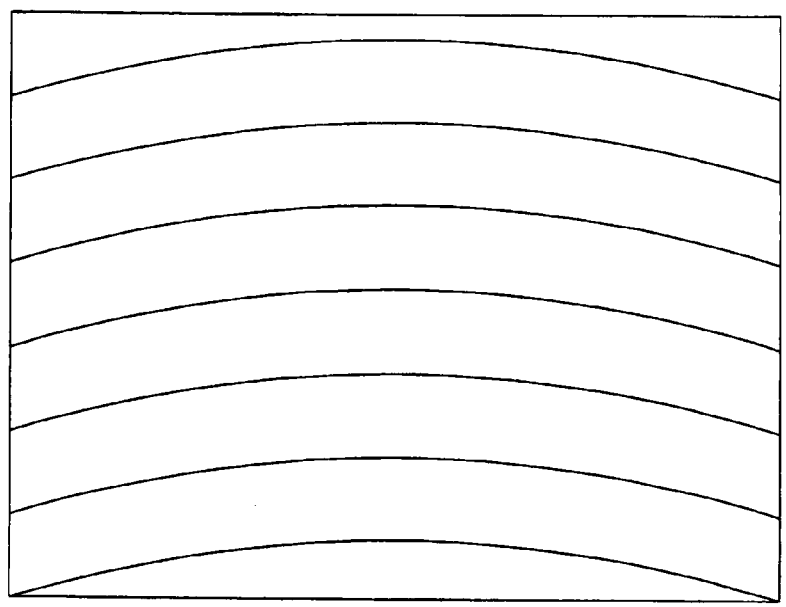
FIG. 2A shows an example of circular arc synchronous fringes.
Figure 2B:
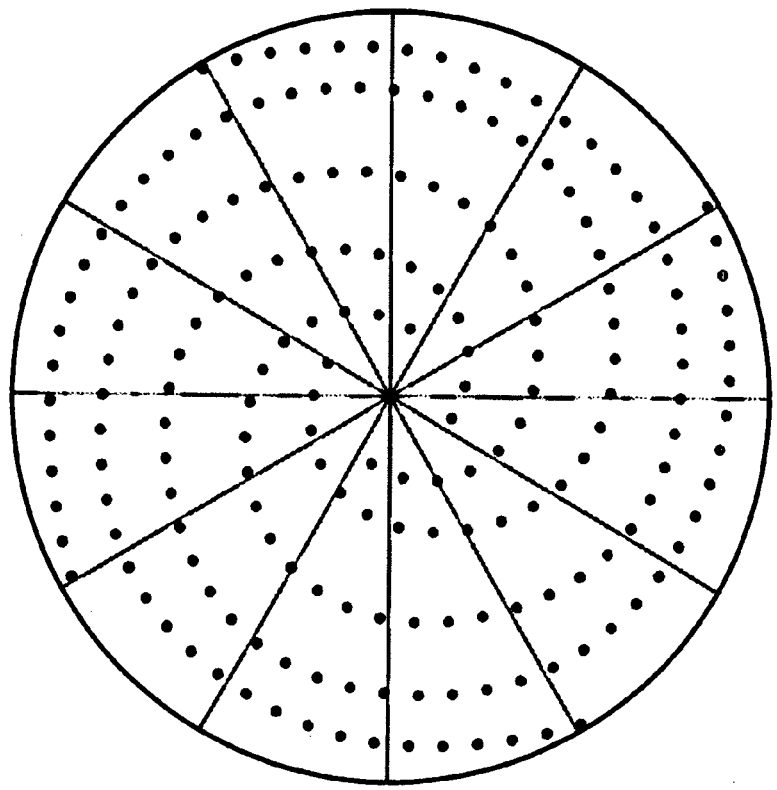
FIG. 2B is an example of a pin hole layout.

2) A sample is not placed on the stage of the confocal microscope shown in FIG. 1. Instead, epi-illumination of a halogen lamp is used as the light source to thus acquire a uniform white image. (A laser is used in an actual measurement. However, great difficulty is encountered in making a fluorescent light from a sample to be uniform in an image area. In order to verify an effect, the halogen lamp is used such that the distribution of light intensity within the image area becomes uniform.)

3) White images are taken while the number of rotation of the Nipkow disk is changed to a minimum value, a maximum value, an optimum value, an optimum value +2, an optimum value +4 and an arbitrary speed, and the appeared synchronous fringes are observed.

4) All of the images are converted into 16-bit TIFF images. Values of a defined area in the row direction thereof are plotted to spreadsheet software, to thus determine a standard deviation of the data. The standard deviation that is smaller than other standard deviations is determined to be effective.

Figure 4:
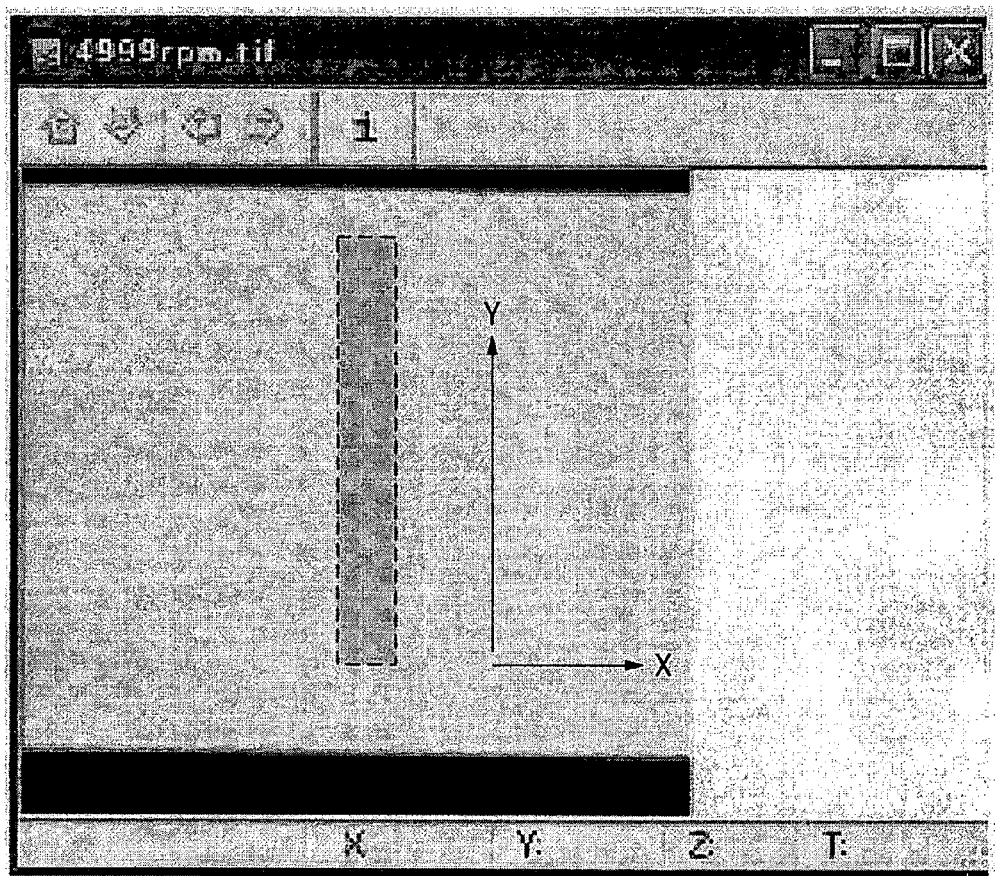
FIG. 4 is a reference view showing a state in which a defined area is selected from an image loaded in a personal computer.

FIG. 4 is a reference drawing showing a state in which a defined area indicated by A is selected from images loaded in a personal computer, for example. The following drawings show a relationship between the number of rotation of the Nipkow disk and brightness within the range.

Figure 5:
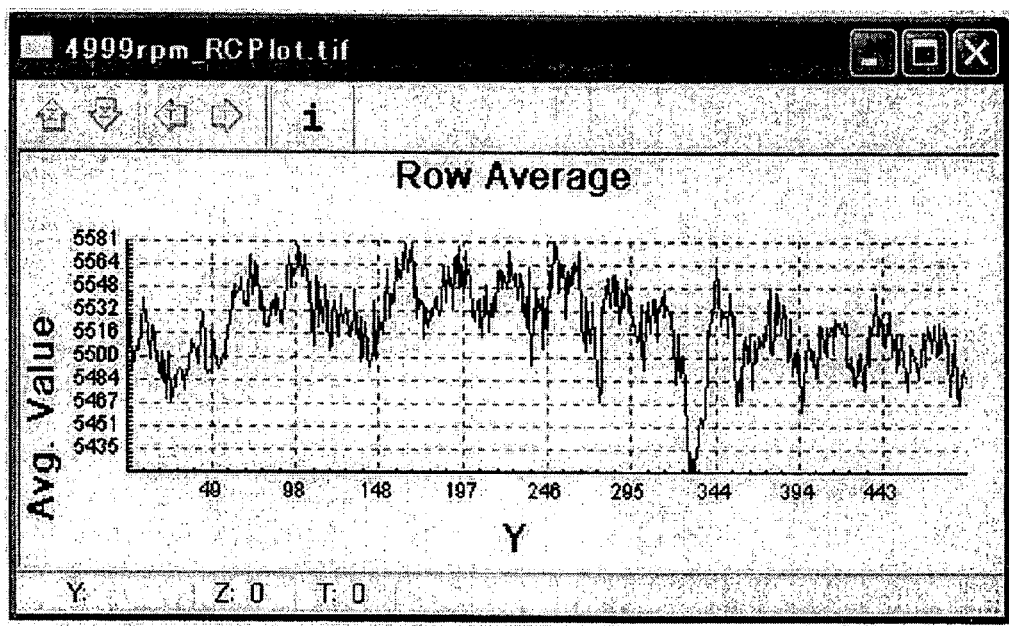
FIG. 5 is a view showing an average brightness value and a result of a command.

FIG. 5 is a drawing showing plots of a relationship between the average brightness of the area indicated by A in a columnar direction (direction X) and the brightness of the same in a direction Y. The vertical axis shows an average brightness level, and the horizontal axis shows the direction Y in FIG. 4. This drawing is used for examining the distribution of light intensity achieved in the direction Y.

Figures 6A, 6B:
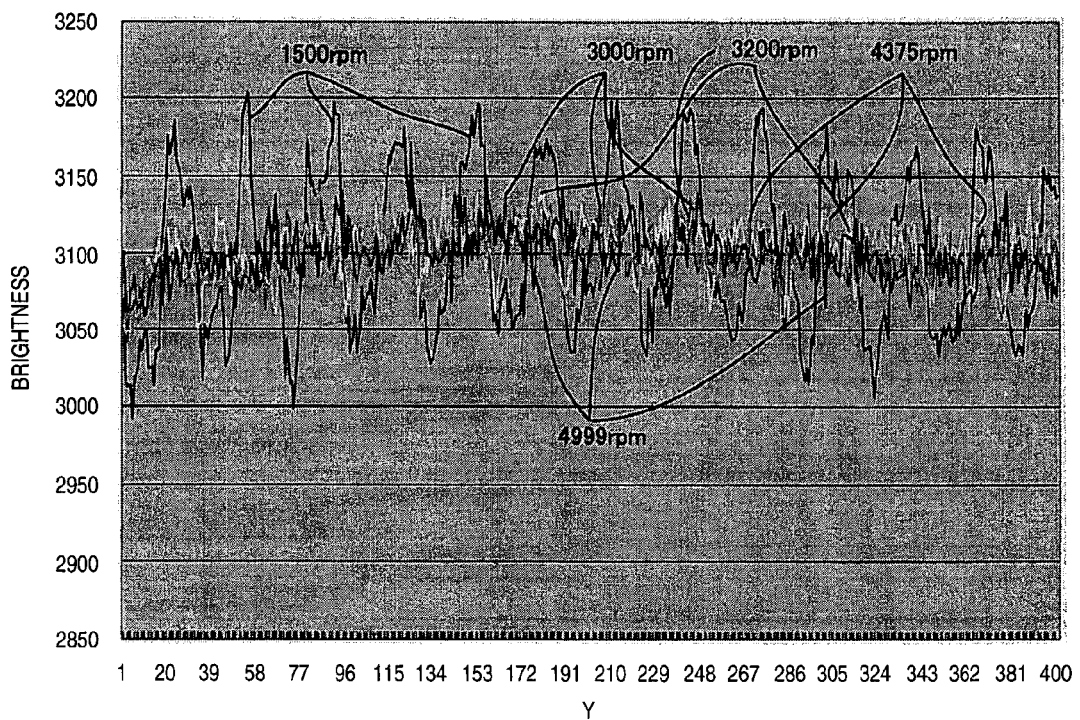
FIGS. 6A and 6B are views showing a relationship among the number of rotations (speed) of a Nipkow disk, an average value (AVE), and a standard deviation ($\sigma$) achieved when the exposure time of the CCD camera is set to a predetermined time.

FIGS. 6A and 6B are drawings showing a relationship among the number of rotation (speed) of the Nipkow disk, the average level (AVE), and the standard deviation (σ), when the exposure time of the CCD camera is set to 24 ms. In FIG. 6A, the average level (AVE) and the standard deviation (σ) are obtained under the assumption that the minimum number of rotation is 1500 rpm, arbitrary speeds are 3000 and 3200, optimum speed is 4375 rpm and the maximum speed is 4999 rpm.

It is conceivable that a result in which the standard deviation and a value obtained by dividing the standard deviation by the average value are smaller is effective. Although the maximum number of rotation, 4999 rpm, has a small standard deviation, practically the disk is rotated at the optimum number of rotation (4375 rpm) in consideration of the life of the motor and that of the Nipkow disk.

FIG. 6B shows brightness levels achieved at the respective numbers of rotation provided in FIG. 6A. The horizontal axis shows numerals (no unit) in the direction Y in FIG. 4, and the vertical axis shows brightness.

In the drawing, the brightness level of 1500 rpm shows large vertical swings, and that synchronous fringes are prone to appear. Further, the drawing shows that vertical swings are small and synchronous fringes are less likely to appear at 3000 rpm to 4999 rpm.

Figure 7A:
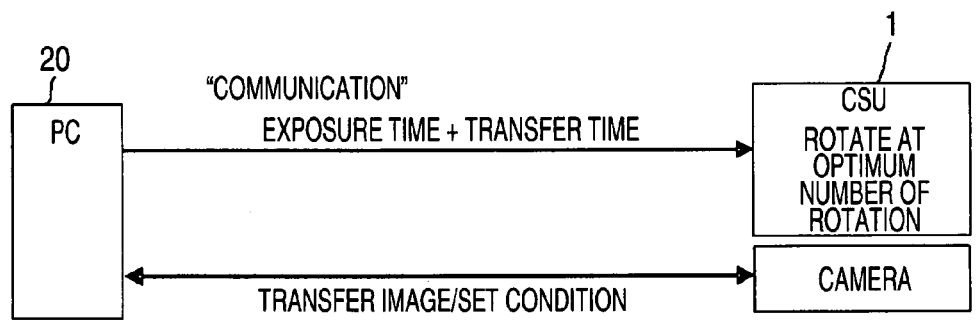
FIGS. 7A and 7B show configurations where the optimum number of rotation is controlled by communication using a personal computer (PC) or the like provided outside of a confocal scanner unit (CSU)
Figure 7B:
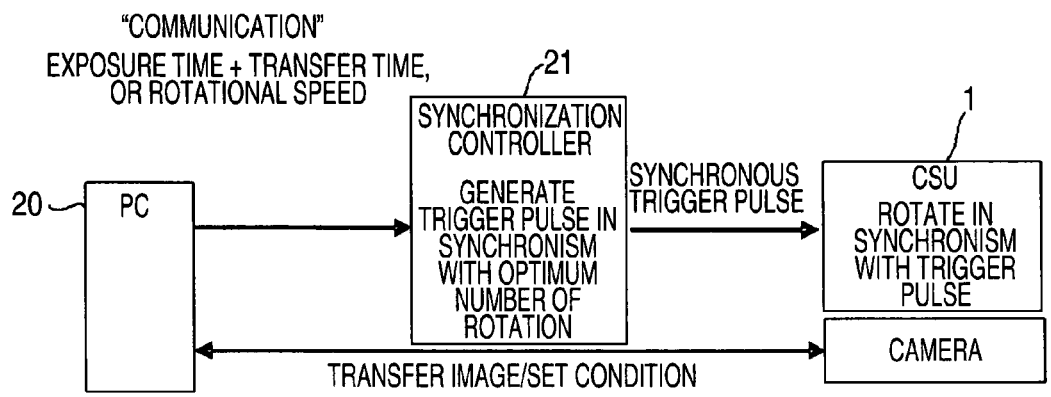

FIGS. 7A and 7B show a configuration in which the optimum number of rotation is controlled by communication using of a personal computer (PC) or the like placed outside the confocal scanner unit (CSU).

Specifically, in FIG. 7A, an external PC 20 is connected to a CSU 1 by a communication line, and an exposure time and a transfer time (a time required to convert electric charges accumulated in CCD into a voltage signal and read the converted voltage signal) are input from the PC to the CSU 1.

The CCD digital camera transfers the image to the PC in accordance with condition settings (the exposure time, the transfer time, gain and the like) transmitted from the PC, whereby the CSU 1 rotates at optimum conditions without generating synchronous fringes.

In FIG. 7B, the external PC 20 and the CSU 1 are connected together via a synchronization controller 21 by the communications line, and the exposure time and the transfer time, or the number of rotation are input from the PC to the CSU 1. Specifically, in the case of the exposure time and the transfer time, the synchronization controller 21 computes the optimum number of rotation and generates a trigger pulse complying with the timing. In the case of the number of rotation, the synchronization controller 21 generates a trigger pulse complying with the number of rotation. The CSU 1 has a mechanism of synchronizing an internal disk to the period of the trigger pulse when the trigger pulse has been input from the outside. Accordingly, also in this case, the CCD digital camera transfers an image to the PC in accordance with the condition settings transmitted from the PC.

Incidentally, when the number of rotation of the Nipkow disk is set to an optimum number of rotation, the exposure time of the camera is set while the phase is synchronized, and images are displayed in time order, there arises a phenomenon that fringes appeared on the screen moves upwardly (or downwardly) as a rotating lamp.

Figure 8A:
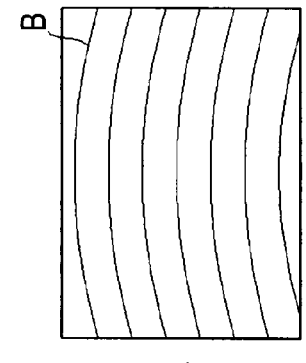
FIGS. 8A-8E are diagrams showing the flow of synchronous fringes and countermeasures against the fringes.
Figure 8B:
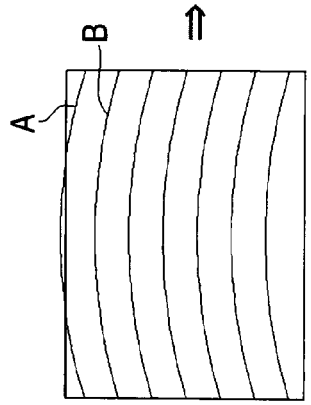
Figure 8C:
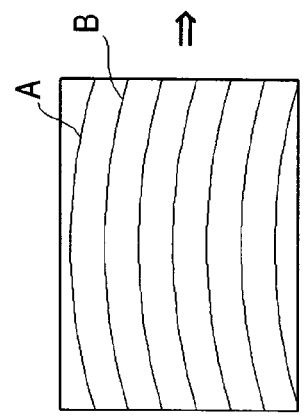

FIGS. 8A to 8C show a phenomenon of synchronous fringes flowing in sequence of FIGS. 8A, 8B, and 8C, and a state in which synchronous fringes indicated by A and B move upwardly.

Next will be described a case where such a phenomenon of flow of synchronous fringes is captured in a single image by double integration (30°*2).

Figure 8D:
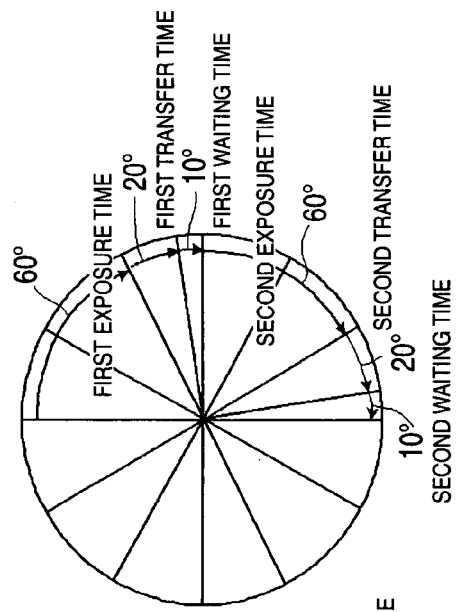

In the case of a non-interlace camera, the exposure time (60°) is followed by a transfer time (20°). Therefore, as shown in FIG. 8D, second exposure begins from 80°, and the phase deviates from increments of 30°. Consequently, a position of fringes is assumed to shift from the position of fringes in the first image.

Figure 8E:
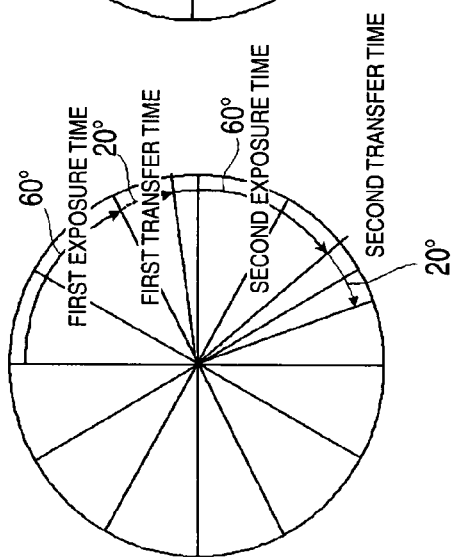

Consequently, as shown in FIG. 8E, an arbitrary waiting time (10° in this embodiment) is provided after the transfer time, and settings are made such that the frame starts from a multiple of 30° (these settings are made from the personal computer side), whereby flow of the synchronous fringes can be prevented. In this case, since the transfer time and the waiting time are added, there are four frames in one rotation.

As is evident from the above descriptions, according to the method of the present invention for adjusting the confocal microscope in which a sample is observed, the phase of the rotation of the Nipkow disk and the phase of the exposure time of the CCD digital camera are matched, and the rotation of a disk of the confocal scanner unit is set to an optimal value. Accordingly, imaging synchronous fringes of a CCD digital camera can be eliminated. Moreover, as a result of the phase of the rotation of the Nipkow disk being matched with the phase of the exposure time of the CCD digital camera, flow of synchronous fringes can be prevented.

The above descriptions merely shows a specific preferred embodiment for the purpose of explanation and illustration of the present invention. Accordingly, the present invention is not limited to the embodiment described above and encompasses additional alterations and modifications without departing from the spirit or scope of the invention.

FIG. 3
1 EXPOSURE TIME
2 INTEGRATION NUMBER
3 ROTATIONAL SPEED

FIG. 6A
1 MINIMUM
2 ARBITRARY
3 ARBITRARY
4 OPTIMUM VALUE
5 MAXIMUM

FIG. 6B
1 PLOT OF BRIGHTNESS IN DIRECTION Y (EXPOSURE TIME: 24 ms)
2 BRIGHTNESS

FIG. 7A
1 "COMMUNICATION"
2 EXPOSURE TIME+TRANSFER TIME
3 TRANSFER IMAGE/SET CONDITION
4 ROTATE AT OPTIMUM NUMBER OF ROTATION
5 CAMERA

FIG. 7B
1 "COMMUNICATION"
2 EXPOSURE TIME+TRANSFER TIME, OR ROTATIONAL SPEED
21 SYNCHRONIZATION CONTROLLER
3 GENERATE TRIGGER PULSE IN SYNCHRONISM WITH OPTIMUM NUMBER OF ROTATION
4 SYNCHRONOUS TRIGGER PULSE
5 ROTATE IN SYNCHRONISM WITH TRIGGER PULSE
6 CAMERA
7 TRANSFER IMAGE/SET CONDITION

FIG. 8D
1 FIRST EXPOSURE TIME
2 FIRST TRANSFER TIME
3 SECOND EXPOSURE TIME
4 SECOND TRANSFER TIME

FIG. 8E
1 FIRST EXPOSURE TIME
2 FIRST TRANSFER TIME
3 FIRST WAITING TIME
4 SECOND EXPOSURE TIME
5 SECOND TRANSFER TIME
6 SECOND WAITING TIME

What is claimed is:

1. A method for adjusting a confocal microscope which includes a microscope unit and a confocal scanner unit of Nipkow disk type, and images a returned fluorescent light of a light beam by a CCD (charge-coupled device) digital camera as a confocal image, the method comprising the step of:
matching a phase of rotation of the Nipkow disk with a phase of an exposure time of the CCD digital camera,
wherein a time (s) required to create one screen of the confocal image is obtained by the following equation:

$$=s60/(\text{a number of the rotation of the Nipkow disk}*12),$$

wherein a unit of the time (s) is a second.

2. The method for adjusting a confocal microscope as claimed in claim 1, wherein provided that an integration number (n) is an integer, an exposure time (t) is obtained by the following equation:

$$\text{the exposure time }(t)=(\text{the integration number }(n))*(\text{the time }(s)\text{ required to create one screen}).$$

3. The method for adjusting a confocal microscope as claimed in claim 2, wherein the integration number (n) is an integer from 8 to 24.

4. The method for adjusting a confocal microscope as claimed in claim 2, wherein the number (f) of the rotation of the Nipkow disk after the exposure time (t) is determined is obtained by the following equation:

$$f=5/\{(\text{the exposure time }(t))/(\text{the integration number }(n))\}.$$

5. The method for adjusting a confocal microscope as claimed in claim 4, wherein the number (f) of the rotation of the Nipkow disk is near an integral value.

6. The method for adjusting a confocal microscope as claimed in claim 5, wherein the integration number (n) is selected to be the largest integer that corresponds to a near integral number (f) of the rotation of the Nipkow disk that is less than 5000 rpm.

7. The method for adjusting a confocal microscope as claimed in claim 4, wherein the exposure time is about 0.024 seconds.

8. The method for adjusting a confocal microscope as claimed in claim 1, wherein a number of the rotation of the Nipkow disk is equal to or more than 1500 rpm and less than 5000 rpm.

9. The method for adjusting a confocal microscope as claimed in claim 8, wherein the number of the rotation of the Nipkow disk is about 4375 rpm.

10. The method for adjusting a confocal microscope as claimed in claim 1, wherein the phase of the rotation of the Nipkow disk and the phase of the exposure time of the CCD digital camera are set by communication using an external device.

11. The method for adjusting a confocal microscope as claimed in claim 1, wherein the phase of the rotation of the Nipkow disk and the phase of the exposure time of the CCD digital camera are set, and
a waiting time is provided after an image transfer time.

12. The method for adjusting a confocal microscope as claimed in claim 1, wherein a pinhole arrangement of the confocal scanner unit is a constant pitch spiral layout.

13. The method for adjusting a confocal microscope as claimed in claim 1, wherein the confocal scanner unit rotates 30 degrees to create one screen.

14. The method for adjusting a confocal microscope as claimed in claim 1, wherein the CCD digital camera performs non-interlace imaging.

* * * * *